United States Patent [19]

Dwulet

[11] Patent Number: 4,600,643

[45] Date of Patent: Jul. 15, 1986

[54] COMPOSITE YARN PRODUCT AND METHOD OF PREPARATION

[75] Inventor: Michaelene Dwulet, Lyndhurst, N.J.

[73] Assignee: Multi-Tex Products Corp., Kearny, N.J.

[21] Appl. No.: 737,764

[22] Filed: May 28, 1985

Related U.S. Application Data

[60] Continuation-in-part of Ser. No. 547,696, Nov. 1, 1983, Pat. No. 4,533,597, which is a division of Ser. No. 362,717, Mar. 29, 1982, abandoned.

[51] Int. Cl.$^4$ ............................................. D02G 3/00
[52] U.S. Cl. ........................................ 428/375; 57/907; 428/364; 428/394; 428/395; 428/390; 428/401
[58] Field of Search .............. 428/364, 373, 374, 375, 428/393, 395, 483, 500, 515, 520, 521, 522, 413, 390, 401; 57/200, 905, 907; 264/147

[56] References Cited

U.S. PATENT DOCUMENTS

| | | | |
|---|---|---|---|
| 2,772,994 | 12/1956 | Lacy | 428/303 |
| 3,100,160 | 8/1963 | Korpman | 428/355 |
| 3,582,418 | 6/1971 | Schuur | 264/147 |
| 3,594,459 | 7/1971 | Keuchel | 264/147 |
| 3,639,573 | 2/1972 | Port | 264/147 |
| 4,345,047 | 8/1982 | Walter | 525/108 |

FOREIGN PATENT DOCUMENTS

| | | | |
|---|---|---|---|
| 47-6055 | 2/1972 | Japan | 264/147 |
| 49-23250 | 6/1974 | Japan | 264/147 |

*Primary Examiner*—Lorraine T. Kendell
*Attorney, Agent, or Firm*—David A. Jackson; Daniel H. Bobis

[57] ABSTRACT

The present invention relates to a composite yarn product, having improved strength and resistance to distortion and fracture in use, in combination with improved texture and appearance. The composite yarn product comprises strands of a composite resin laminate prepared from at least three film layers, with a centrally colored substrate prepared from a synthetic resin film, and paired outer films individually formed and adhesively attached to the substrate by heat and pressure. The film layers are bonded together by an adhesive composition. The adhesive composition comprises a first component and a second component, the first component including a resin material selected from acrylonitrile-butadiene copolymers, and butadiene-styrene copolymers. The first component is prepared in an organic solvent system. The second component contains an epoxy resin such as a bisphenol A-derived diepoxide, and a vinylchloride-vinylacetate copolymer, prepared in a like organic solvent system.

11 Claims, No Drawings

COMPOSITE YARN PRODUCT AND METHOD OF PREPARATION

CROSS REFERENCE TO RELATED APPLICATIONS

The present application is a Continuation-In-Part of co-pending application No. 547,696, filed Nov. 1, 1983, now U.S. Pat. No. 4,533,597, which is in turn a Division of Ser. No. 362,717, filed Mar. 29, 1982, now abandoned.

FIELD OF THE INVENTION

The present invention relates generally to composite yarn products, and particularly to such products having an improved adhesive composition useful in their preparation.

DESCRIPTION OF THE PRIOR ART

Generally, composite yarn products are known, and may be prepared by a variety of techniques, yielding products ranging from ribbon strips to light-conductive fibers. Thus, U.S. Pat. No. 2,166,819 to Miller prepares a two-ply ribbon strip by adhesively bonding two layers of plastic to each other and thereafter longitudinally slitting the composite product. U.S. Pat. No. 3,361,616 to Scharf discloses the preparation of a composite yarn by the disposition of actual strands of thread or strands of metalized material between two resinous sheets. Finally, U.S. Pat. No. 3,666,587 to Nagao shows the preparation of a light-conducting fiber by the preparation of a sandwich of a polystyrene material between acrylic sheet materials.

Notwithstanding the above, certain materials have been developed and are presently in wide use as yarn products, which are particularly attractive and provide a multi-colored textured hue that is desirable for incorporation in clothing fabric, drapery materials and trim accessories. In particular, such materials may comprise a thermoplastic film which is given multiple iridescent coatings, to capture different reflective colorations depending upon its angle of exposure to light. This material may be prepared from natural or synthetic resins and may have as many as 120 layers of colors applied with rollers, and may be prepared to a thickness of 0.8 mil.

Certain difficulties have developed in the use of this material, as it offers a soft hand, but tends to fracture and break during manufacture and subsequent use. Attempts to strengthen this material by offering a thicker base, and by preparing composite yarn products where the film is disposed upon one or more base sheet layers, have all failed, as either the additional thickness renders the resulting yarn aesthetically undesirable and awkward to process and weave, or the incremental increases in thickness are insufficient to remedy the weakness of the yarn product.

As set forth in my earlier co-pending applications, a composite yarn product was disclosed and prepared which utilized a multi-coated cellulosic resinous central layer disposed between two polyester resin sheets which were of equal thickness. This particular composite and the adhesive compositions with which it was formed offered particular advantage, in that the coated central substrate is particularly colorful and capable of a variety of decorative uses, and the resulting composite yarn product possesses the increased strength and processability desirable in a product for use in yarn processing.

The present invention therefore is predicated upon the discovery that similar composites may be prepared utilizing central substrates of other materials, that will offer similar improvements in the combined properties of attractive appearance and feel, with durability and processability.

SUMMARY OF THE INVENTION

In accordance with the present invention, a composite yarn product is prepared which utilizes a multi-coated synthetic resinous central layer disposed between two polyester resin sheets of equal thickness. The central layer may be prepared from a variety of synthetic resins, such as polyesters, polyolefins, vinyl polymers and other materials capable of being spun or woven into fibers and advantageously pigmented or otherwise attractively coated. Preferably, the central substrate comprises a polyester composition such as polyethylene terephthalate. The polyester sheets may comprise polyethylene terephthalate and are bonded to the synthetic resinous central layer by an adhesive composition having a particular formulation.

The adhesive of the present invention comprises a mixture of a first component and a second component. The first component contains a resin selected from acrylonitrile-butadiene resins, butadiene-styrene resins, and mixtures thereof, and may be prepared by dissolving in an organic solvent system.

The second component of the present adhesive composition, comprises a vinylchloride-vinylacetate copolymer in mixture with an epoxy resin both of which are disposed in a single solution in a like organic solvent system.

The preparation of the adhesive comprises the mixture of the second component and the addition thereto of the mixture of the first component under agitation.

More particularly, the first component of the present adhesive composition may comprise an acrylonitrile-butadiene copolymer present in an amount by weight of the total composition of up to about 10%. The vinylchloride-vinylacetate copolymer may likwise be present in an amount of up to about 10% by weight and the epoxy resin may be present in an amount by weight of up to about 5%, the remainder of the adhesive composition comprising a mixture of the respective solvents.

The adhesive composition of the present invention facilitates the preparation of the composite laminate and, by its ability to provide unexpected adhesion and additional strength, permits the preparation of a composite yarn product of relatively minimal thickness, that nonetheless exhibits the desired properties of strength, in its resistance to delamination and fracture under tension.

Accordingly, it is a principal object of the present invention to provide an improved yarn product offering a combination of texture and strength.

It is a further object of the present invention to provide a yarn product as aforesaid which may be prepared simply and inexpensively.

It is a further object of the present invention to provide an adhesive composition for use in the preparation of the yarn product as aforesaid, which contributes to the improved properties thereof.

Other objects and advantages will become apparent to those skilled in the art from a review of the ensuing description.

DETAILED DESCRIPTION

In accordance with the present invention, a composite yarn product is prepared which comprises a synthetic resinous film having a multiple iridescent coating disposed thereon, which is bonded in sandwich relationship between two thermoplastic resinous materials. Both the synthetic resinous central film or layer and the thermoplastic resinous materials forming the outer surfaces of the composite product, may be selected from polyesters, such as polyethylene terephthalate, polyolefins such as polypropylene and polystyrene, vinyl polymers such as polyvinyl chloride, and others. Perferably, polyester films, and, in particular, such films having thicknesses ranging from about 0.25 to about 1.0 mil may be used, to form a composite yarn product having an aggregate thickness of less than 2.0 mil.

One of the primary features of the present invention, comprises the adhesive composition utilized to bond the outer films to the coated base film. The adhesive composition is prepared as two components, the first component comprising a resin selected from butadiene-acrylonitrile resins and butadiene-styrene resins. A particular acrylonitrile-butadiene is preferred, and comprises a copolymer marketed by B.F. Goodrich Chemical Co. under the designation Hycar 1472. The molecular weight of this product ranges up to about 100,000. The percent of acrylonitrile by weight is about 34–36% and that of butadiene is about 66–64%.

In the instance where the first component utilizes a butadiene-styrene resin, it may comprise a rubber-like copolymer having low molecular weight. In particular, the butadiene-styrene copolymer may have molecular weights ranging from about 1,000 to about 10,000, and may contain an average of from about 2 to about 5 OH groups per molecule.

The first component, containing either of the above resins is then prepared in an appropriate solvent system. The solvents may be those organic materials such as acetone, toluol, methylethyl ketone and methylisobutyl ketone. In particular, the first component may be prepared in a solvent solution with a mixture of toluol and acetone. The solvent may comprise approximately 45% of the total of the first component, with the toluol present in an amount ranging from about 50 to 60% by weight of the total solvent present, and acetone comprising the rest. Preferably, the solvent component is comprised of 55% toluol and 45% acetone.

The second component of the present adhesive composition comprises a vinylchloride-vinylacetate copolymer and an epoxy resin. The vinylchloride-vinylacetate copolymer may be present in an amount ranging up to about 10% by weight of the total adhesive composition, and the epoxy resin may be present in an amount of up to about 5% by weight.

The vinylchloride-vinylacetate copolymer contains at least 85% vinylchloride, and preferably about 85 to 93% vinylchloride. A particularly useful copolymer is manufactured by Union Carbide Corporation and is identified as VMCH, with from 85% to 88% vinylchloride, from 10.8% to 14.2% vinylacetate and from 0.8% to 1.2% maleic acid. The vinylchloride-vinylacetate copolymer provides improved strength to the adhesive bond formed with the present composition. The vinylchloride-vinylacetate copolymer is preferably present within the second component, in an amount by weight thereof, ranging from about 7 to about 14%, and preferably about 10%.

Epoxy resins suitable for use in the second component comprise those compounds having two epoxy groups in their molecules, such as the diglycidyl ethers derived from bisphenols or halogenated bisphenols; cycloaliphatic polyepoxy compounds; glycidyl ethers of novolak resins, and the like. Preferably, the epoxy resins comprise diepoxy compounds derived from bisphenol A, and have epoxy equivalents ranging from about 150 to 200. A particularly suitable epoxy compound comprises EPON 828 ® manufactured by Shell Chemical Corp., having an epoxy equivalent ranging from 185–192 and a viscosity of from 110–150 poise at 25° C.

The epoxy compound provides improved adhesion in coaction with the acrylonitrile-butadiene copolymer and the vinylchloride-vinylacetate copolymer, and when applied to the polyester sheets, quickly cures under laminating temperatures and pressures to form the final multi-layered product.

The second component is prepared independently and contains a larger quantity of solvents. In particular, both toluol and acetone are likewise useful, and may be present in amounts, in combination, of up to about 90% by weight of the second component. Each of the solvents may be present in approximately equal amounts, with a slight excess of toluol permissible. The present adhesive may be prepared by mixing the ingredients of the first component initially. Thus, the solvents are mixed and stirred, and the acrylonitrile-butadiene copolymer is thereafter slowly added under agitation until it is fully dissolved.

The second component is prepared by combining the respective solvents under agitation, after which the epoxy resin is added with continued agitation after addition is complete. Preferably, agitation may continue for a period of up to $\frac{1}{2}$ hour after all of the epoxy resin has been added to the mixture. Thereafter, the vinylchloride-vinylacetate copolymer is slowly added with continued agitation until all of the vinyl copolymer has been added and has dissolved.

Upon the completion of the individual preparations of the first and second components, the first component is then slowly added to the second component under similar agitation until such addition is complete. Agitation may continue beyond the completion of addition, and, for example, the resulting mixture may be agitated, as by stirring, for a period of about 1 hour.

Thereafter, the resulting adhesive composition may be diluted by the addition of diluents such as the solvents methylethyl ketone and methylisobutyl ketone, until the mixture possesses a viscosity of approximately 25 seconds (No. 2 Zahn Cup). At this point, the adhesive is ready for use in the preparation of the multi-layered composite yarn.

While specific materials have been disclosed above for use in the first and second components of the present adhesive composition, it is to be understood that these materials may vary within the scope of the invention, to encompass those chemically equivalent materials that would serve the same respective functions within the composition. The invention is therefore intended to embrace these equivalent materials within its spirit and scope, the foregoing description comprising an illustration of a best mode of the practice of the invention.

The composite yarn product of the present invention may be prepared in the following manner. The colored base or substrate may be laminated to a film such as the films recited earlier, by the application of a thin coating of adhesive to the latter, followed by feeding the film and the coated substrate through pressure rollers, at an elevated temperature. After initial contact between the first outer film and the substrate, the resulting composite is passed through an oven to drive off the solvents in the adhesive formulation. Thereafter, the substrate may pass through a pair of heating rollers, to complete the lamination cycle. Preferably, the temperature of the rollers is in excess of 220° F., and the rolling pressures are on the order of 4,000 PSI.

The foregoing procedure is repeated to bond the second outer film to the opposite broad surface of the substrate, so that the resulting three-layered composite film emerging from the heated rollers is ready for final processing.

The foregoing procedure is useful in accordance with a first embodiment of the invention, and may be modified as follows. The adhesive may be applied directly to the coated substrate or base film by spraying, calendering, or the like, and thereafter the outer films may be applied in liquid form thereto. After drying, the coated composite may be passed through heated rollers to assure uniformity of thickness and adhesion, and the resulting product may then be ready for final processing.

Final processing of the composite product comprises the slitting of a master roll thereof to band widths in a manner well known in the art, followed by further slitting of individual bands to yarn sizes ranging from 1/100th of an inch, to other sizes either smaller or larger, depending upon desired end use. The specific procedure of sheet and band slitting is well known in the art and does not, per se, form a part of the present invention.

As noted earlier, the primary features of the present invention, are the ability of the final product to maintain an acceptable texture or hand, while providing sufficient resilience and strength to successfully withstand the strain imposed by yarn processing. The capability of the yarn products is in large measure a function of the properties imparted by the adhesive composition, that facilitates the preparation of this multi-layered product.

The present invention will be better understood from a consideration of the following illustrative examples, in which all proportions expressed by weight are intended to be percent by weight.

EXAMPLE 1

An adhesive composition was prepared having a first component and a second component, the first component comprising the following ingredients:

| INGREDIENTS | AMOUNT (KILOGRAMS) |
|---|---|
| Acrylonitrile-butadiene copolymer (HYCAR 1472) | 14 |
| Toluol | 5.8 |
| Acetone | 4.8 |

Toluol and acetone were mixed and thereafter the resin was added with stirring. The stirring was continued until the resin was duly added and completely dissolved.

The second component of the adhesive composition was prepared with following ingredients:

| INGREDIENTS | AMOUNT (KILOGRAMS) |
|---|---|
| Epoxy resin (EPIKOTE 1001 manufactured by Shell Chemical Company having an epoxy equivalent of 189) | 5.6 |
| Vinylchloride-vinylacetate-maleic acid copolymer (VMCH manufactured by Union Carbide Corporation) | 13.8 |
| Toluol | 68 |
| Acetone | 60 |

The solvents toluol and acetone were combined and mixed with stirring. The epoxy resin was thereafter added and the resulting mixture stirred for ½ hour. The vinyl copolymer was then added with continued stirring until completely in solution.

After each component was prepared, the first component was added to the second component under stirring and thereafter stirring was continued for approximately 1 hour. All stirring conducted in this Example was performed with a power mixer.

After combination of the first and the second component was complete, the resulting mixture was diluted by the addition of methylethyl ketone and methylisobutyl ketone to a viscosity of approximately 24 seconds, measured with a No. 2 Zahn Cup. The resulting formulation was thereafter complete and ready for use.

EXAMPLE II

The adhesive composition prepared in Example I was utilized to prepare a composite yarn product as follows. A cellulose ester film of approximately 0.8 mil having a multiplicity of iridescent coatings thereon, known conventionally as Iris Film, was bonded to a 0.25 mil clear polyester film comprising polyethylene terephthalate. The adhesive of Example I was applied to the clear polyester film and that film was then joined with the central iridescent film between pressure rollers. Thereafter, the resulting laminate was passed through an oven having a temperature of 175° F., to volatize off the solvents contained in the adhesive. Thereafter, the laminate was passed through two pairs of heating rollers, maintained at a temperature of 225° F. and applying a pressure of 400 PSI.

The above procedure was repeated with the application of a second clear polyester film to the unbonded side of the central iridescent film to prepare the final composite laminate. The laminate was thereafter slit to band widths which were, in turn, slit to yarn sizes of 1/100th of an inch. The yarn products produced thereby exhibited a softness of texture and faithful retention of color, together with improved strength and resistance to fracture and distortion in use.

EXAMPLE III

A further composite yarn product was prepared in the same manner as described in Example II, above, with the difference that the central iridescent film was prepared from a polyester film having a thickness of about 0.85 mil. The remainder of the processing was completed and the resulting yarn offered the same improved texture, strength and integrity that was found with the yarns prepared by the previous Example.

While the foregoing invention has described the preparation of a composite yarn utilizing as a base or substrate a multicoated iridescent film, it is to be understood that the base or substrate may comprise a film coated with a vaporized metal, such as aluminum, chromium, and the like. Such vaporized coatings may be applied by techniques well known in the art.

Likewise, while a three-layered laminate has been described, additional layers may be applied by the similar technique, utilizing the adhesive of the present invention.

The present adhesives provide an advantage in addition to strength and flexibility, in that they resist discoloration and therefore faithfully preserve the initial appearance of the underlying base or substrate.

This invention may be embodied in other forms or carried out in other ways without departing from the spirit or essential characteristics thereof. The present disclosure is therefore to be considered as in all respects illustrative and not restrictive, the scope of the invention being indicated by the appended claims, and all changes which come within the meaning and range of equivalency are intended to be embraced therein.

I claim:

1. A composite yarn product comprising strands of a composite resinous laminate, said laminate having at least 3 film layers thereof, and consisting essentially of:
   A. a central substrate comprising a colored non-cellulosic thermoplastic synthetic resinous material having two opposed surfaces;
   B. an outer thermoplastic film adhered to each of said opposed surfaces;
   C. an adhesive composition adhering said substrate to the adjacent surfaces of said outer films, said adhesive composition applied to the adjacent surfaces of said outer films prior to the placement of said adjacent surfaces against the respective surfaces of said colored substrate, said adhesive composition consisting essentially of:
      i. a first component, said first component comprising a resin material selected from copolymers of acrylonitrile and butadiene, and copolymers of butadiene and styrene, in an amount by weight of said adhesive composition of up to about 10%, and at least one organic solvent present in an amount by weight, based on said composition of about 10%; and
      ii. a second component comprising a vinylchloride-vinylacetate copolymer, present in an amount by weight of from about 5% to about 10%, an epoxy resin present in an amount of about 5% by weight, and a solvent system for said second component present in an amount up to about 75% by weight of said adhesive composition;
      iii. said first and said second components initially prepared individually, and said second component is dispersed in said first component; and
   D. wherein the completed yarn product possesses an aggregate thickness of no greater than 2 mil.

2. The product of claim 1 wherein the resin material in said first component comprises an acrylonitrile-butadiene copolymer.

3. The product of claim 2 wherein said acrylonitrile is present in an amount by weight of said resin material of from about 34 to about 36%, and said butadiene is present in an amount by weight of about 66% to about 64%.

4. The product of claim 1 wherein the resin material of said first component comprises a butadiene-styrene resin.

5. The product of claim 4 wherein said butadiene-styrene resin is rubber-like and has a low molecular weight, ranging from about 1,000 to about 10,000.

6. The product of claim 1 wherein solvent system is said first component comprises a mixture of toluol and acetone.

7. The product of claim 6 wherein said toluol is present in an amount by weight of said solvent system of about 55%, and said acetone constitutes the remainder thereof.

8. The product of claim 1 wherein the solvent system in said second component comprises a mixture of toluol and acetone.

9. The product of claim 8 wherein said toluol and said acetone are present in approximately equal amounts with respect to each other.

10. The product of claim 1 wherein said vinylchloride-vinylacetate copolymer contains at least 85% to about 93% by weight thereof, of vinylchloride, the remainder essentially vinylacetate.

11. The product of claim 10 wherein said vinylchloride-vinylacetate copolymer comprises 85% to 88% by weight vinylchloride, 10.8% to 14.2% vinylacetate, and from 0.8% to 1.2% maleic acid.

* * * * *